United States Patent
Bourbeau et al.

(10) Patent No.: US 8,893,555 B2
(45) Date of Patent: Nov. 25, 2014

(54) PRESSURE MEASURING INSTRUMENT

(75) Inventors: Kevin M. Bourbeau, Pepperell, MA (US); Eric C. Beishline, Marlborough, MA (US); Michael J. Amirto, Ashburnham, MA (US); Gino A. Pinto, Milford, MA (US); Benjamin F. Fontaine, Lunenburg, MA (US)

(73) Assignee: Setra Systems, Inc., Boxborough, MA (US)

( * ) Notice: Subject to any disclaimer, the term of this patent is extended or adjusted under 35 U.S.C. 154(b) by 385 days.

(21) Appl. No.: 13/491,842

(22) Filed: Jun. 8, 2012

(65) Prior Publication Data
US 2013/0055820 A1    Mar. 7, 2013

Related U.S. Application Data

(60) Provisional application No. 61/529,990, filed on Sep. 1, 2011.

(51) Int. Cl.
*G01L 9/00* (2006.01)
*G01L 19/04* (2006.01)

(52) U.S. Cl.
CPC ............... *G01L 19/04* (2013.01); *G01L 9/0072* (2013.01)
USPC .......................................................... 73/717

(58) Field of Classification Search
CPC ............................. G01L 19/04; G01L 9/0072
See application file for complete search history.

(56) References Cited

U.S. PATENT DOCUMENTS

| | | | |
|---|---|---|---|
| 4,823,603 A | 4/1989 | Ferran | |
| 5,442,962 A * | 8/1995 | Lee | 73/718 |
| 5,939,639 A | 8/1999 | Lethbridge | |
| 2002/0078758 A1 * | 6/2002 | Suzuki et al. | 73/753 |

OTHER PUBLICATIONS

Ceramic Brazing. http:/www.azom.com/article.aspx?ArticfleID=1079.

* cited by examiner

*Primary Examiner* — Lisa Caputo
*Assistant Examiner* — Brandi N Hopkins
(74) *Attorney, Agent, or Firm* — Beusse Wolter Sanks & Maire, P.A.

(57) ABSTRACT

A pressure sensor (40) useful as a vacuum manometer. A reference pressure cavity (50) of the sensor is evacuated through an evacuation opening (72) located behind a plate portion (54) of the sensor electrode (52) having a non-planar surface for supporting the diaphragm (44) during an overpressure event. The electrode is hermetically sealed to the body (42) of the sensor by a brazed joint with a ceramic seal member (60) disposed there between. The brazed joint may include a layer of buffer material (79) which provides a degree of malleability to the joint to avoid cracking of the ceramic seal member. The brazed ceramic/metal joint permits the selection of materials such that differential thermal expansion effects can be passively minimized. The electrode is connected to the sensor circuitry (84) by a wire having a spring section (53), thereby providing a stress free interconnection.

20 Claims, 3 Drawing Sheets

PRESSURE MEASURING INSTRUMENT

This application claims benefit of the 1 Sep. 2011 filing date of U.S. provisional patent application No. 61/529,990.

FIELD OF THE INVENTION

This invention relates generally to the field of pressure measuring instruments, and in particular to a vacuum manometer or other low pressure sensor.

BACKGROUND OF THE INVENTION

FIG. 1 is a cross-sectional view of a typical prior art pressure sensor 10 useful for measuring full scale pressures on the order of 1000 Torr or less; sometimes referred to as a vacuum manometer or capacitance diaphragm gauge. The body 12 of the sensor 10 may be formed of a high nickel alloy, stainless steel, or other engineering material in order to provide protection against induced corrosion. A thin metallic diaphragm 14 is disposed between the body 12 and the lower body 13 and separates a hollow space within the body 12 into a measured pressure cavity 16 and a reference pressure cavity 18. The measured pressure cavity 16 is in fluid communication with a measured pressure that is being communicated via an inlet tube 20. The inlet tube 20 is held in place by a weld joint 21 or similar method such as brazing. The pressure in the reference pressure cavity 18 is reduced to a controlled low reference pressure by a vacuum pump or other vacuum source (not shown) via evacuation tube 22. The evacuation tube 22 is held in place by a braze joint 23 or similar joining method such as solder. The low reference pressure is maintained in the reference pressure cavity 18 by a getter pump 24, which is a reactive material which absorbs gas molecules from the reference pressure cavity 18 by chemical reaction or adsorption. The getter pump 24 is separated from the reference pressure cavity 18 by a filter screen 25. Disposed above the diaphragm 14 and separated from it by a gap G is a sensing electrode 26 made of an electrically conductive material. The conductive diaphragm 14 and the electrode 26 function together as a capacitor to provide a capacitance signal to sensing circuitry 28 of the pressure sensor 10. The electrode 26 includes an electrode post 27 which is electrically insulated from the body 12 of the sensor 10 by a compression glass to metal seal 30. One skilled in the art will appreciate that as the measured pressure changes, there is a corresponding pressure change in the measured pressure cavity 16, which in turn causes the diaphragm 14 to deflect, changing the size of the gap G and the value of the capacitance measured between the diaphragm 14 and the electrode 26. The sensing circuitry 28 is calibrated to convert a measured capacitance to an output signal indicative of the pressure applied in the measured pressure cavity 16.

Any variable that affects the size of gap G will be detected and indicated as a change in the measured pressure. Variables other than applied pressure that affect the size of gap G are sources of error in the electrical output signal of the vacuum manometer. One such variable is temperature. Different materials used to construct the various components of the sensor 10 have different coefficients of thermal expansion (CTE), thereby causing relative dimensions within the sensor 10 to vary with temperature changes. The use of a hermetic compression seal between the body 12 and the electrode post 27 creates one source of this type of measurement error. As stated above, the material of the body 12 is selected for its corrosion resistance and generally has a relatively high CTE. The hermetic joint between the body 12 and the electrode post 27 is achieved by heating the assembled body 12/glass seal 30/electrode post 27 combination to a temperature high enough to soften the glass seal 30, thereby allowing it to flow into complete conforming contact between the body 12 and electrode post 27. As the temperature is cooled back to ambient, the glass seal 30 hardens and becomes compressed between the body 12 and the electrode post 27 due to the relatively high CTE of the body 12 and relatively lower or matched CTE of the electrode post 27. The material of the glass seal 30 is selected to be electrically insulating and to have a CTE that is lower than that of the material of the body 12, but higher than or matched with the electrode post 27. The material of the electrode post 27 is selected to be electrically conductive and to have a CTE that is lower than or matched with that of both the body 12 and the glass seal 30, and may be for example a nickel-iron alloy. Thus, as the assembled body 12/glass seal 30/electrode post 27 combination cools, the body 12 compresses onto the glass 30, which in turn compresses onto the electrode post 27, thereby creating a hermetic seal. As the temperature of the sensor 10 changes during operation, the relatively high CTE body 12 and the relatively low CTE electrode post 27 will experience differential thermal growth, thereby changing gap G and introducing an error into the output signal. Prior art devices are known to compensate for such error by measuring the temperature and applying a correction algorithm within the sensing circuitry 28.

In another example of prior art, a scheme with a dual electrode is used such as described in U.S. Pat. No. 4,823,603. This approach uses two electrodes screened onto a flat ceramic substrate which is parallel and offset at a distance from a thin metal foil diaphragm. The diaphragm is supported along its periphery and it displaces in the shape of a dome toward the electrodes as the measured pressure increases. The dual electrode design allows for the elimination of some measurement errors by the subtraction of the reference capacitance from the sensing capacitance. This approach adds incremental cost and manufacturing difficulty over the single electrode design of FIG. 1.

BRIEF DESCRIPTION OF THE DRAWINGS

The invention is explained in the following description in view of the drawings that show.

DETAILED DESCRIPTION OF THE INVENTION

The present inventors have recognized several limitations in prior art pressure sensors and have developed an improved device which overcomes these limitations and provides superior performance and cost advantage, as described herein.

Figure 2:
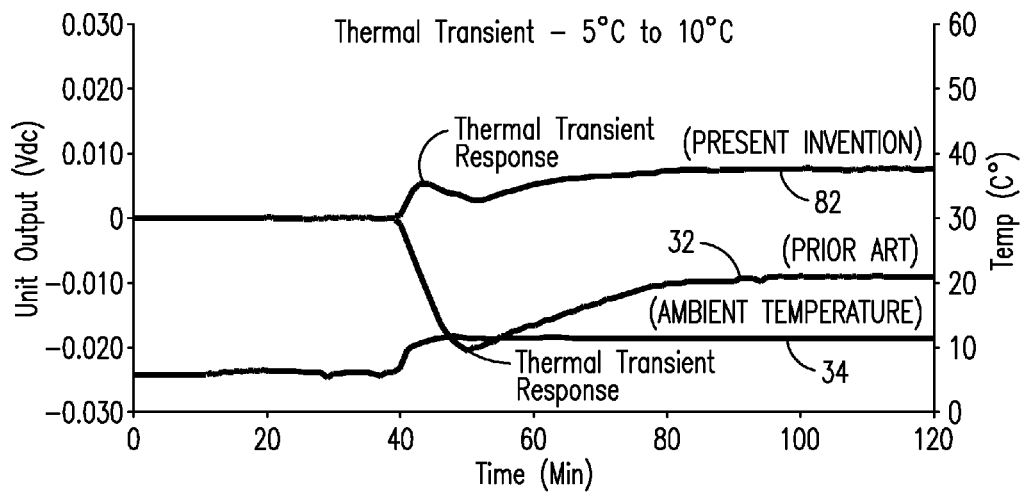
FIG. 2 is a chart comparing the temperature transient performance of a prior art pressure sensor with that of a sensor in accordance with an embodiment of the present invention.

One such limitation relates to the compensation for temperature induced output errors. FIG. 2 is a chart illustrating the electrical output 32 from a prior art pressure sensor as a function of time where the ambient temperature 34 is changed from about 6° C. to about 12° C. at time equal 40 minutes. The measured pressure is held constant below the measurement range of the devices under test for this figure. As a result of the temperature change, the output of the prior art sensor 32 changes from approximately 0.000 Vdc at 6° C. and stabilizes at approximately −0.009 Vdc at 12° C. at time equal 80 minutes. Compensation for that steady state output difference can be adequately provided within the sensor circuitry 28. However, the present inventors have recognized that this prior art solution is not completely effective during the short time period immediately following the temperature transient, when the output of the sensor 32 can drop to as low as −0.020 Vdc before it recovers to the steady state value, possibly due to differing warming rates for different components of the sensor. Such short term transient errors may be further compounded if the temperature sensor used in the compensation circuitry and the various components of the pressure sensor do not change temperatures at the same rate. Thus, the present inventors have recognized that electrical compensation alone is not an optimal solution for thermally induced errors, and they have developed a pressure sensor which minimizes the generation of such errors, as described below.

Figure 1:
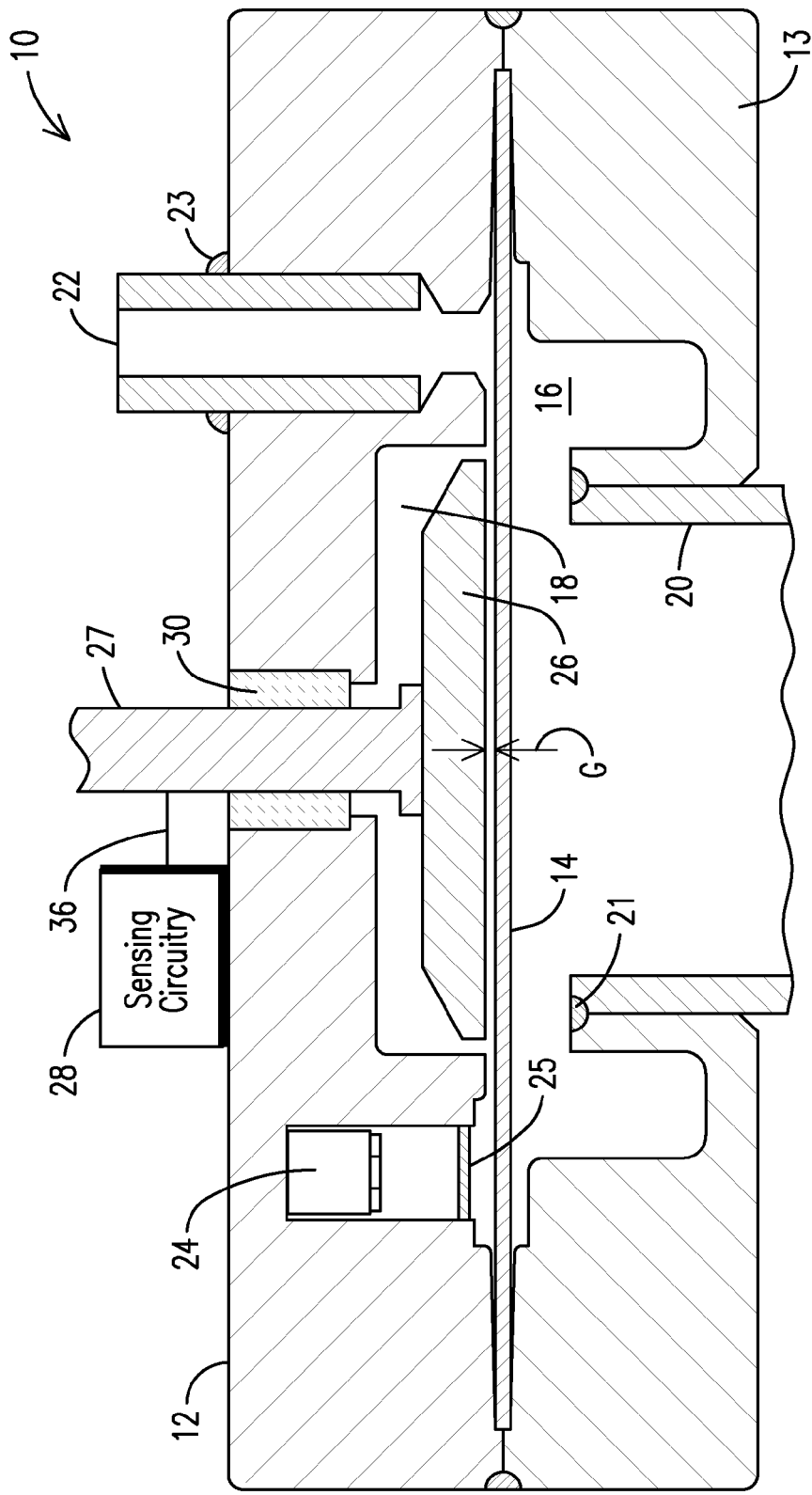
FIG. 1 is a cross-sectional view of a prior art pressure sensor.

Furthermore, the prior art pressure sensors such as sensor 10 of FIG. 1 is vulnerable to overpressure events. The typical vacuum manometer may be subjected to overpressures of 15 psia or even 45 psia. The present inventors have found that such high overpressures may cause small permanent deformations of the diaphragm 14 of the sensor 10, resulting in a change in the capacitance signal of the sensor and a resulting output error. Such errors may go unnoticed and uncompensated until the next routine calibration of the instrument. Thus, the present invention provides a pressure sensor which is less vulnerable to such overpressure events as described below.

Furthermore, prior art pressure sensors such as sensor 10 of FIG. 1 may be vulnerable to long term instability. It has been shown that glass properties, namely dielectric, can vary with time and temperature. Changes in dielectric in the glass to metal seal are measured as changes in capacitance by the sensing circuitry 28, resulting in a pressure signal error. Thus, the present invention provides a pressure sensor with a ceramic to metal seal which exhibits greater stability of material properties than prior art glass to metal seals.

Finally, an output error may occur in prior art pressure sensors as a result of the interconnection 36 of the electrode 26 and the sensing circuitry 28. That interconnection 36 in some prior art sensors may be a socket mounted rigidly to a printed circuit board forming part of the sensor circuitry 28 into which the electrode 26 plugs directly. Such interconnections 36 can impose mechanical stress into the electrode 26, which in turn can result in small displacements in the electrode 26 and corresponding changes in gap G with corresponding output errors. In other prior art pressure sensors, the interconnection is formed by a wire welded to the electrode 26 which is not optimized for manufacturability.

Figure 3:
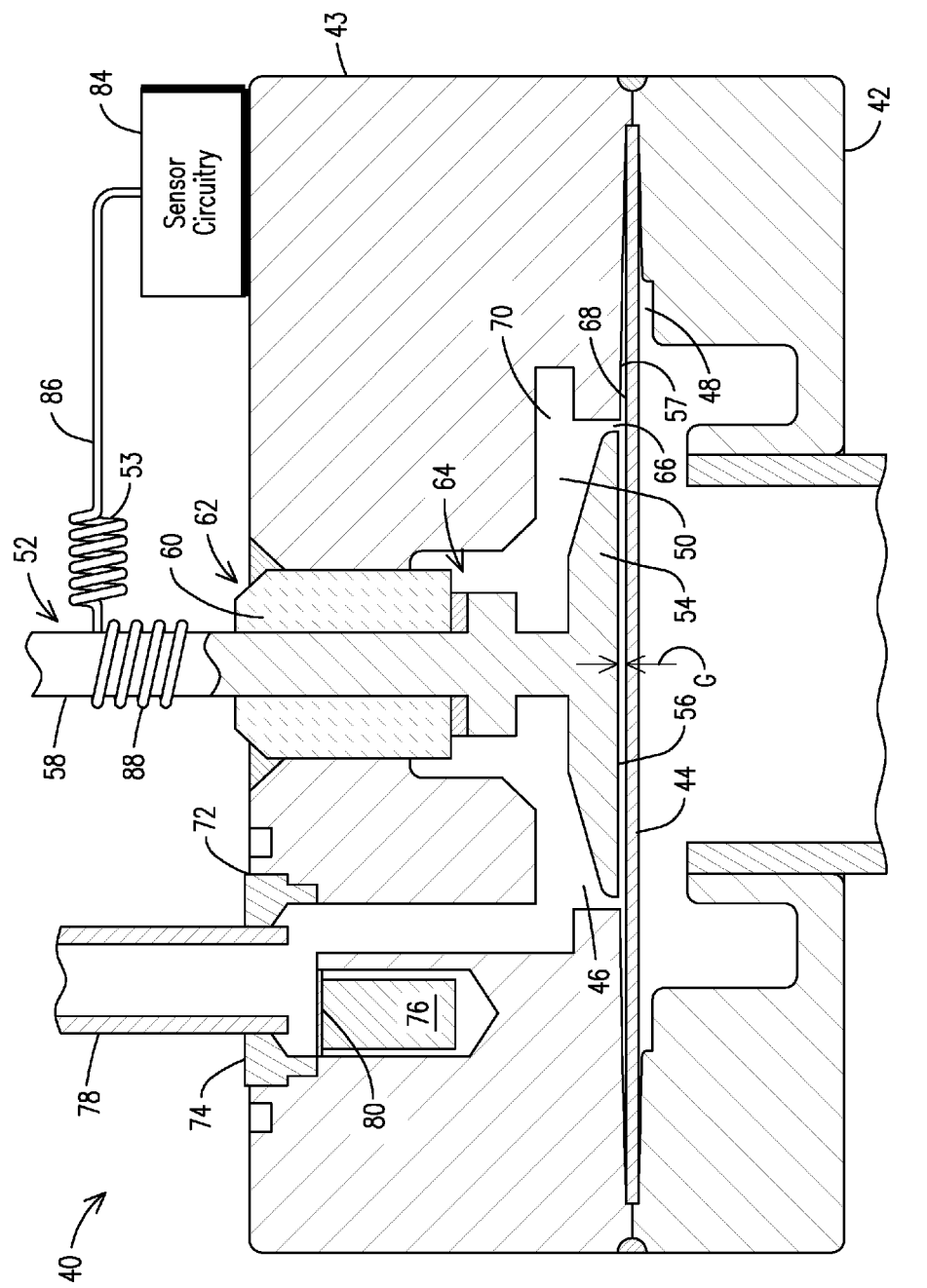
FIG. 3 is a cross-sectional view of a pressure sensor in accordance with one embodiment of the present invention.

Accordingly, an improved pressure sensor 40 is described herein and is illustrated in one embodiment in FIG. 3. Pressure sensor 40 includes a lower body 42 and sensor body 43 both made of a corrosion resistant material such as a nickel-chrome alloy or equivalent engineering material. A thin metallic diaphragm 44 is physically joined near the perimeter of either or both of the lower body 42 and sensor body 43 by a method such as welding. The diaphragm 44 separates a hollow space 46 within the sensor body 43 and lower body 42 into a measured pressure cavity 48 and a reference pressure cavity 50. The sensor 40 also includes an electrode 52. The electrode 52 has a plate portion 54 with a face 56 separated from the diaphragm 44 by a gap G to form a capacitance there between, and further has a post 58 extending from the plate portion 54 through the sensor body 43.

A ceramic insulator 60 is disposed between the electrode post 58 and the sensor body 43 to provide electrical insulation there between. In contrast to the prior art, the opening in the sensor body 43 surrounding the electrode plate portion 54 is sealed with a brazed ceramic to metal seal rather than a prior art glass to metal compression seal. A first top portion 62 of the ceramic insulator 60 is brazed to the sensor body 43 and a second bottom portion 64 of the ceramic insulator 60 is brazed to the electrode post 58. While brazing is a known joining process, there are risks with hermetically joining a ceramic seal member surrounding the electrode of a pressure sensor due to problematic cracking of the seal member as a result of heat-induced stresses in the materials. The present inventors have overcome this problem by using a ceramic seal member and a unique braze joint as described more fully below. The brazed joint forms a hermetic seal and also supports the plate portion 54 within the reference pressure cavity 50 in a position spaced from the sensor body 43 around a perimeter of the plate portion 54 by a vacuum relief space 66 and parallel to the diaphragm 44 at a distance equal to the gap G. The plate portion 54 of the electrode 52 divides the reference pressure cavity 50 into a front volume 68 adjacent the face 56 and a rear volume 70 behind the plate portion 54. The front volume 68 and rear volume 70 are in fluid communication through the vacuum relief space 66.

An evacuation opening 72 is provided through the sensor body 43 and into the rear volume 70 such that a vacuum applied at the evacuation opening 72 will evacuate the rear volume 70 directly and will evacuate the front volume 68 through the vacuum relief space 66. The evacuation opening 72 may further include a manifold 74 which is in fluid communication with the rear volume 70, and with a getter pump 76, and with an evacuation tube 78 which is connected to a vacuum pump or other vacuum source (not shown). The getter pump 76 may be isolated from the manifold 74 and other portions of the system by a screen 80 to prevent the passage of any particles released from the getter pump 76. By locating the evacuation opening 72 and getter pump 76 in a position behind the plate portion 54, it can be seen in FIG. 3 that during an overpressure event when the diaphragm 44 is forced toward the electrode face 56, the diaphragm 44 is supported across almost all of its surface area by either the electrode face 56 or sensor body 43, with only a small area being unsupported at the location of the vacuum relief space 66. Importantly, the diaphragm 44 cannot make contact with the evacuation opening 72 or getter pump screen 80, which are stress concentrators for the diaphragm during overpressure events in prior art single electrode devices. This design requires only a single pneumatic path away from the reference pressure cavity 50, thereby reducing manufacturing cost, reducing the volume that needs to be evacuated, and also reducing the surface area that may outgas, thereby allowing for a lower base pressure in the reference cavity 50 and/or a smaller getter pump 76 than in prior art devices. Thus, the pressure sensor 40 of FIG. 3 is less expensive to manufacture and is less susceptible to damage caused by overpressure events than is the prior art sensor 10 of FIG. 1.

Furthermore, the diaphragm of a prior art device 10 of FIG. 1, is subjected to locally high mechanical stresses during overpressure events as it is deformed into conformance with the flat planar shape of the electrode face and body. During normal fluctuations of the measured pressure, the diaphragm 14 will deflect into a generally domed shape. Upon the occurrence of an overpressure event, the center of the diaphragm 14 will first make contact with the electrode 26, and as the pressure continues to increase, an increasingly large area extending from the center of the diaphragm 14 will be pressed against the flat electrode, resulting in a stress concentration around the periphery of the area in contact with the electrode 26. The inventors have recognized that such localized stress concentrations can result in local permanent deformations of the diaphragm, resulting in measurement errors once the pressure returns to a normal range. In extreme cases the stress concentrations can cause the diaphragm 14 to rupture. To mitigate this potential source of error, embodiments of the present invention may include an electrode face 56 that has a non-planar shape, generally corresponding to the domed shape of the diaphragm 44 when it is subjected to an overpressure condition. A surface 57 of the body 42 that comes into contact with the diaphragm 44 during an overpressure event may continue this non-planar profile such that the diaphragm is provided with continuous support across its area during the overpressure event. In one embodiment the non-planar surfaces 56, 57 are effective to eliminate regions of localized stress concentration in the diaphragm 44 of more than 50% higher than the average stress in the diaphragm.

Figure 4:
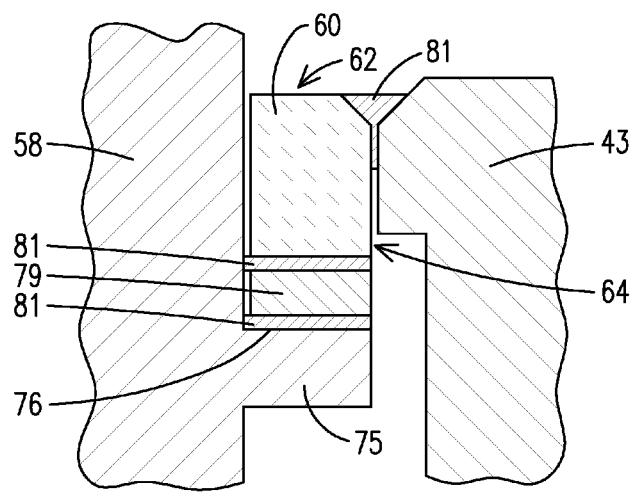
FIG. 4 is a cross-sectional view of a portion of a braze joint providing a hermetic seal between the electrode post and body of a pressure sensor in accordance with one embodiment of the present invention.

Details of the braze joint providing the hermetic seal between the electrode post 58 and the sensor body 43 are now discussed with reference to FIG. 4. The electrode post 58 is provided with a ledge 75 having an upwardly facing surface 76 to facilitate the assembly of the ceramic insulator 60 into position prior to brazing. The ceramic 60 may be formed of a material providing the necessary electrical insulating properties, for example 96% alumina alloy. Advantageously, the electrode post 58 is formed of a material, for example a Series 300 stainless steel, having a coefficient of thermal expansion (CTE) that is greater than that of the corrosion resistant nickel-chrome alloy sensor body 43. The ceramic 60 is stacked on the surface 76 above a layer of buffer material 79, such as a copper or other appropriate alloy having an appropriate thickness and malleability, which in turn is sandwiched between layers of a braze material 81. Cooperating sloped surfaces in the top portion 62 of the ceramic 60 and the sensor body 43 define a groove into which braze material 81 is placed. The assembly is then heated to melt the braze material 81, thereby forming the braze joint(s) upon cooling and re-solidification. Because the braze material 81 is typically relatively thin and hard, similar prior art braze joints without the layer of buffer material 79 tend to form cracks in the relatively brittle ceramic material due to the large difference in CTE at the ceramic/metal interface. However, the layer of buffer material 79 is relatively ductile and can be more closely thermally matched to the ceramic and so provides a degree of malleability and stress relief to the joint, thereby providing a hermetic seal without cracking of the ceramic seal member 60. This innovative construction enables passive reduction of thermal offset sensitivity through designing the composite thermal expansion of the sensor element (i.e. proportions of ceramic insulator 60, braze material 81, buffer material 79 and electrode 58) to match the thermal expansion of the sensor body 43. One skilled in the art will appreciate that the buffer material may be provided at the braze joint between the seal member 60 and the electrode 58 (as illustrated), or at the braze joint between the seal member 60 and the sensor body 43, or at both locations.

In another embodiment of the ceramic seal, the layer of buffer material may be applied as a thick plating of a ductile material such as copper onto surface(s) of the ceramic seal 60. While the metalizing of a ceramic material with copper is known, such metalized surfaces are typically very thin. The present invention applies a layer of buffer material having a thickness effective to relieve CTE mismatch stresses during the ceramic/metal braze. In contrast to prior art ceramic/metal brazes that are designed to keep the ceramic in compression in order to avoid cracking, the present invention reduces the stress created during the braze process so that cracking is avoided even if the ceramic does go into tension. In various embodiments, the plated layer(s) of ductile (buffer) material may have a combined thickness of more than 0.010 inch. Such a plated surface can be brazed with standard brazing materials, whereas brazing directly to the ceramic material requires special methods to encourage wetting. In another embodiment, the braze material itself may be a ductile material, such as a copper/silver alloy, so that the residual stress imposed on the ceramic due during the braze process is kept below a level that results in cracking of the ceramic seal 60.

While the prior art glass to metal compression seal required that the sensor body 12 and electrode 26 of FIG. 1 have significantly different CTEs, the braze joint of the present invention allows the electrode 52 and the sensor body 43 to be formed of materials with similar CTEs which when optimally selected with corresponding optimal axial lengths, can be designed to match the thermal expansion of the upper sensor body 42. In one embodiment, the CTE of the stainless steel electrode post 58 is somewhat higher than the CTE of the corrosion resistant nickel-chrome alloy sensor body 43, and the CTE of the buffer material 79 is even higher than that of the stainless steel. These differences alone would result in the gap G decreasing with an increasing temperature. However, the CTE of the ceramic seal 60 is much less than that of those metal components, thereby influencing the gap G to increase with an increasing temperature, resulting in a net axial thermal growth of the system wherein the gap G is relatively unaffected by temperature changes. The CTE of the braze material 81 also impacts the thermal expansion characteristics of the system, although one skilled in the art will realize that it has a lesser impact since the axial thickness of braze material is relatively small compared to the axial length of the other components.

Accordingly, the impact of temperature changes upon the gap G is minimized, and the performance of the sensor 40 during a temperature transient is improved when compared to a prior art device, as can be appreciated in FIG. 2. Whereas curve 32 demonstrates how a prior art pressure sensor experiences large transient measurement errors during the early phase of a temperature transient (time 40-80 minutes), a device built in accordance with an embodiment of the present invention will experience a much smaller short-term transient error, as illustrated by curve 82. While some long term steady state temperature effect remains and can be compensated electronically, one will appreciate that the magnitude of the short term transient error is only about one-fourth that of the prior art device in the illustrated example. Because the short term transient effect is at least partially due to the thermal lag of the sensor components compared to that of the temperature detector used to sense ambient temperature, and because the magnitude of the compensation provided electronically is lower with the present invention than in prior art devices, the transient impact of the component/detector lag is also minimized in devices of the present invention.

Returning to FIG. 3, the interconnection between the electrode 52 and the sensor electronics 84 is now described. A wire 86, for example formed of a beryllium copper material, is formed as a coil 88 and is wrapped around the electrode post 58 at a first end and is connected to the circuitry 84, such as by soldering, at a second end. The elasticity of the coil 88 provides a constant contact pressure adequate to achieve the desired electrical connection, although optionally at least part of the coil 88 may be soldered to the post 58. Alternatively, one end of the coil could be soldered to a socket that is, in turn, plugged onto the electrode post 58. Additionally the wire may have a compliant spring section 53 in series with the connection. The compliant spring section 53 has a lower stiffness than other sections of the wire 86 and is effective to provide a reliable low stress interconnection between the circuitry 84 and the electrode post 58. The spring section 53 is effective to eliminate deviations in the gap G caused by mechanical and/or thermal forces imposed on the electrode post 58 by the wire 86 as are present in the prior art. This design also eliminates material reliability and manufacturability difficulties known in the prior art when using a welded interconnection.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A pressure sensor comprising:
   a body defining an interior space;
   a diaphragm dividing the interior space into a measured pressure cavity and a reference pressure cavity;
   a measured pressure inlet in the body in fluid communication with the measured pressure cavity;
   a single electrode comprising a plate portion having a face separated from the diaphragm by a gap to form a capacitance there between, and further comprising a post extending from the plate portion through the body;
   a ceramic seal member disposed between the electrode and the body to provide electrical insulation there between, a first portion of the ceramic seal member being brazed to the body and a second portion of the ceramic seal member being brazed to the electrode to form a hermetic seal there between and to support the plate portion within the reference pressure cavity in a position spaced from the body by a vacuum relief space;
   the plate portion of the electrode dividing the reference pressure cavity into a front volume adjacent the face and a rear volume behind the plate portion, the front volume and rear volume in fluid communication through the vacuum relief space; and
   an evacuation opening through the body and into the rear volume, such that a vacuum applied at the evacuation opening will evacuate the rear volume directly and will evacuate the front volume through the vacuum relief space.

2. The pressure sensor of claim 1, wherein the evacuation opening further comprises a manifold, the manifold in fluid communication with the rear volume, and with a getter pump, and with an evacuation tube.

3. The pressure sensor of claim 1, further comprising:
   the electrode post comprises a ledge;
   a layer of buffer material disposed over a top surface of the ledge;
   the ceramic seal member disposed over the layer of buffer material;
   wherein when the second portion of the ceramic seal member is brazed to the electrode to form the hermetic seal, the layer of buffer material provides a degree of stress relief between the ceramic seal member and the electrode effective to prevent cracking of the ceramic seal member.

4. The pressure sensor of claim 3, wherein the buffer material comprises copper.

5. The pressure sensor of claim 1, further comprising:
   circuitry supported by the body and electrically connected to the electrode post with a wire;
   wherein the wire comprises a spring section effective to mitigate stress imposed on the electrode post by the wire.

6. The pressure sensor of claim 1, wherein at least one of a braze joint between the ceramic seal member and the electrode and a braze joint between the ceramic seal member and the body comprises a buffer material effective to prevent cracking of the ceramic seal member during brazing.

7. The pressure sensor of claim 1, further comprising:
   a coefficient of thermal expansion (CTE) of the electrode being greater than a CTE of the body;
   a CTE of the ceramic seal member being less than the CTE of the electrode and less than the CTE of the body;
   wherein axial length proportions of the ceramic seal member and electrode are selected to mitigate thermal offset sensitivity of the gap.

8. A pressure sensor comprising:
   a body;
   a diaphragm separating a measured pressure cavity from a reference pressure cavity within the body;
   an electrode comprising a plate portion having a face separated from the diaphragm by a gap to form a capacitance there between, and further comprising a post extending from the plate portion through a body of the pressure sensor;
   circuitry supported by the body and electrically connected to the electrode to receive a capacitance signal; and
   a wire comprising a coil surrounding the electrode post at a first end and connected to the circuitry at a second end to conduct the capacitance signal.

9. The pressure sensor of claim 8, wherein the wire further comprises a spring section effective to mitigate stress imposed on the electrode post by the wire.

10. A pressure sensor comprising:
    a body;
    a diaphragm separating a measured pressure cavity and a reference pressure cavity within the body;
    an electrode comprising a plate portion having a face separated from the diaphragm by a gap to form a capacitance there between, and further comprising a post extending from the plate portion through the body;
    a ceramic seal member disposed between the post and the body; and
    a hermetic seal between the post and the body comprising a braze joint comprising a buffer material between the ceramic seal member and at least one of the post and the body.

11. The pressure sensor of claim 10, further comprising:
    a ledge formed on the post;
    a layer of the buffer material disposed over a top surface of the ledge;
    the ceramic seal member disposed over the layer of buffer material;
    braze material joining the ledge to the layer of buffer material, and joining the layer of buffer material to the ceramic seal member, the layer of buffer material providing a degree of stress relief between the ceramic seal member and the electrode during a brazing process effective to prevent cracking of the ceramic seal member.

12. The pressure sensor of claim 11, wherein the buffer material comprises a plating of the buffer material formed on the ceramic seal member.

13. The pressure sensor of claim 11 wherein the buffer material comprises copper.

14. The pressure sensor of claim 11, wherein the buffer material comprises a copper/silver braze material.

15. The pressure sensor of claim 10, wherein the hermetic seal comprises a braze joint between the ceramic seal member and the post, and wherein the braze joint further comprises a layer of the buffer material disposed between the ceramic seal member and the post.

16. The pressure sensor of claim 10, wherein the hermetic seal comprises a braze joint between the ceramic seal member and the body, and wherein the braze joint further comprises a layer of the buffer material disposed between the ceramic seal member and the body.

17. A pressure sensor comprising: a body; a diaphragm separating a measured pressure cavity and a reference pressure cavity within the body; an electrode comprising a plate portion having a face separated from the diaphragm by a gap to form a capacitance there between, and further comprising a post extending from the plate portion through the body; a ceramic seal member disposed between the post and the body; and a hermetic seal between the post and the body comprising a ceramic seal member and a braze interface joining the ceramic seal member to the post and to the body; wherein materials and axial length proportions of the ceramic seal member, braze interface, and electrode are chosen so as to match a thermal expansion characteristic of the body in order to substantially eliminate thermal offset sensitivity of the gap.

18. The pressure sensor of claim 17, wherein the braze interface comprises a buffer material providing a degree of ductility effective to prevent cracking of the ceramic seal member during a braze process.

19. The pressure sensor of claim 18, wherein the buffer material comprises a layer of copper.

20. The pressure sensor of claim 17, wherein:
the body comprises a nickel-chrome alloy;
the electrode comprises a stainless steel; and
the ceramic seal member comprises an alumina alloy.

* * * * *